United States Patent [19]
Freire et al.

[11] Patent Number: 5,976,346
[45] Date of Patent: *Nov. 2, 1999

[54] MEMBRANE HYDRATION IN ELECTROCHEMICAL CONVERSION OF ANHYDROUS HYDROGEN HALIDE TO HALOGEN GAS

[75] Inventors: Francisco Jose Freire; Edward Joseph Fahy; Dennie Turin Mah; Kenneth Bernard Keating, all of Wilmington, Del.; Douglas John Eames, Chamblee, Ga.; William H. Zimmerman, Wilmington; James Arthur Trainham, Greenville, both of Del.; Clarence Garlan Law, Jr., West Trenton, N.J.; John Scott Newman, Kensington, Calif.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/861,558

[22] Filed: May 22, 1997

Related U.S. Application Data

[63] Continuation of application No. 08/432,410, May 1, 1995, abandoned, which is a continuation-in-part of application No. 08/156,196, Nov. 22, 1993, Pat. No. 5,411,641, and application No. 08/246,909, May 20, 1994, Pat. No. 5,580,437, which is a continuation-in-part of application No. 08/156,196.

[51] Int. Cl.⁶ .................................................. C25B 15/00
[52] U.S. Cl. ...................... 205/349; 205/618; 205/619; 205/620; 204/263; 204/265; 204/266; 204/237; 204/239
[58] Field of Search ................................. 205/349, 618, 205/619, 620, 498; 204/263, 265, 266, 296, 237, 239

[56] References Cited

U.S. PATENT DOCUMENTS

| | | | |
|---|---|---|---|
| 3,453,187 | 7/1969 | Slatin | 204/69 |
| 3,729,395 | 4/1973 | Caron et al. | 204/59 R |

(List continued on next page.)

FOREIGN PATENT DOCUMENTS

| | | |
|---|---|---|
| 1 179 631 | 12/1984 | Canada . |
| 1 195 949 | 10/1985 | Canada . |
| 0 319 489 | 6/1989 | European Pat. Off. . |
| 2 413 481 | 7/1979 | France . |
| 2 312 297 | 3/1973 | Germany . |
| 56-36873 | 8/1981 | Japan . |
| 363424 | 12/1931 | United Kingdom . |
| 861978 | 3/1961 | United Kingdom . |

OTHER PUBLICATIONS

Appleby, A.J. et al., Solid Polymer Acid Electrolytes, *Fuel Cell Handbook*, 10, 286–312.

(List continued on next page.)

*Primary Examiner*—Kathryn Gorgos

[57] ABSTRACT

The present invention relates to an electrochemical cell, system and process for converting essentially anhydrous hydrogen halide to essentially dry halogen gas. The process of the present invention is useful for converting anhydrous hydrogen halide, in particular, hydrogen chloride, hydrogen fluoride, hydrogen bromide and hydrogen iodide, to a halogen gas, such as chlorine, fluorine, bromine, or iodine. In particular, in the present invention, water is provided to the cation-transporting membrane at the cathode in various ways. The present invention allows for recovery of a released fluid at the cathode-side of the membrane and recycling of the released fluid back to the cathode side of the membrane. In this way, the recovered, released fluid may be recycled to continuously supply water to the membrane, thereby allowing the limiting current density of the cell to be increased and/or controlled.

67 Claims, 5 Drawing Sheets

U.S. PATENT DOCUMENTS

| | | | |
|---|---|---|---|
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,969 | 7/1980 | Lawrance | 204/255 |
| 4,224,121 | 9/1980 | Dempsey et al. | 204/98 |
| 4,240,884 | 12/1980 | Pellegri | 204/95 |
| 4,294,671 | 10/1981 | Balko | 204/128 |
| 4,308,124 | 12/1981 | Pellegri | 204/95 |
| 4,311,568 | 1/1982 | Balko | 204/128 |
| 4,595,579 | 6/1986 | Prudhon et al. | 423/487 |
| 4,655,887 | 4/1987 | Oda et al. | 204/98 |
| 4,666,574 | 5/1987 | Oda et al. | 204/98 |
| 4,725,341 | 2/1988 | Minz | 204/128 |
| 4,909,912 | 3/1990 | Oda et al. | 204/98 |
| 4,959,132 | 9/1990 | Fedkiw, Jr. | 204/101 |
| 5,223,102 | 6/1993 | Fedkiw, Jr. et al. | 204/78 |
| 5,580,437 | 12/1996 | Trainham | 205/621 |
| 5,635,052 | 6/1997 | Freire et al. | 204/265 |

OTHER PUBLICATIONS

Jewulski, J.R., et al., Solid State Proton Conductors, *Fuel Report, Work Performed Under Contract No.: DE–AC21–88MC24218 for U.S. Department of Energy,* 1–99, Dec. 1990.

Minz, F.R. (Dr.), HCl–Electrolysis—Technology for Recycling Chlorine, *Bayer AG,* Apr. 21–23, 1993.

Takenaka, H., et al., Solid Polymer Electrolyte Water Electrolysis, *Int. J. Hydrogen Energy,* 7(5), 397–403, 1982, No month available.

Wilson, M.S. et al., High Performance Catalyzed Membranes of Ultra–low Pt Loadings for polymer Electrolyte Fuel Cells, *J. Electrochem. Soc.,* 2, L–28–L–30, Feb. 1992.

MEMBRANE HYDRATION IN ELECTROCHEMICAL CONVERSION OF ANHYDROUS HYDROGEN HALIDE TO HALOGEN GAS

CONTINUING APPLICATION DATA

This application is a continuation of U.S. application Ser. No. 08/432,410, filed May 1, 1995, which was abandoned. Application Ser. No. 08/432,410 is a continuation-in-part of U.S. application Ser. No. 08/156,196, filed Nov. 22, 1993, now U.S. Pat. No. 5,411,641, issued May 2, 1995, which was surrendered in favor of reissue application U.S. application Ser. No. 09/093,468 filed Jun. 8, 1998, and of U.S. application Ser. No. 08/246,909, filed May 20, 1994, now U.S. Pat. No. 5,580,437, issued on Dec. 3, 1996, which was surrendered in favor of reissue application U.S. application Ser. No. 09/093,535 filed Jun. 8, 1998, said Ser. No. 08/246,909 which is a continuation-in-part of U.S. application Ser. No. 08/156,196 .

BACKGROUND OF THE INVENTION

1. Field of the Invention

The present invention relates to an electrochemical cell, system and process for converting essentially anhydrous hydrogen halide to essentially dry halogen gas. The process of the present invention is useful for converting anhydrous hydrogen halide, in particular, hydrogen chloride, hydrogen fluoride, hydrogen bromide and hydrogen iodide, to a halogen gas, such as chlorine, fluorine, bromine, or iodine.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

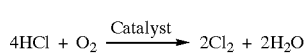

(1)

where the following catalysts may be used, depending on the reaction or process in which equation (1) is used.

| Catalyst | Reaction or Process |
|---|---|
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

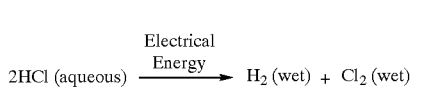

(2)

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

(3)

Further, the presence of water in the Uhde system limits the current densities at which the cells can perform to less than 500 amps/ft², because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

The conductivity of a membrane is directly related to the water content in the membrane and decreases at low water content. Limiting current density occurs when the concentration of water within the membrane reaches a value that will no longer support additional proton conduction. Therefore, limiting current density can develop when the conductivity decreases due to low water concentrations. When a cell is run above limiting current, the components of the cell may be destroyed.

The existing electrochemical processes for converting hydrogen halides as discussed above are aqueous processes which require first dissolving the hydrogen halide in water. Since these electrochemical cells have water in their anolytes and catholytes, the membranes of such cells are normally kept hydrated.

There exists a need for directly producing essentially dry halogen gas without having to first dissolve the hydrogen halide in water, and for keeping the membrane hydrated during such a process. This would allow the limiting current density of the cell to be increased and/or controlled, so that the cell components would not be destroyed.

SUMMARY OF THE INVENTION

The present invention solves the problems of the prior art by providing an electrochemical cell, system and process for directly producing essentially dry halogen gas from essentially anhydrous hydrogen halide. This cell, system and process allow for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electrochemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

In the anhydrous cell, system and process of the present invention, the membrane is kept hydrated. This enables the limiting current density of the cell to be increased, as well as controlled. In turn, this allows an electrochemical cell to be designed in which a valuable component, such as the cation-exchange membrane, is protected from prolonged exposure to excessive current, which could deteriorate the membrane, and thus impact the membrane's and the cell's long-term performance. Moreover, control of limiting current is especially desirable where it is necessary to compensate for changes in manufacturing rates of suppliers of the anhydrous hydrogen halide, such as hydrogen chloride.

In accordance with the present invention, the membrane of an electrochemical cell used to convert essentially anhydrous hydrogen halide to essentially dry halogen gas is kept hydrated in a variety of ways. The advantages achieved by keeping the membrane hydrated by these various ways make the process of the present invention even more practicable and more economically attractive.

In one particular embodiment of the present invention, the membrane is kept hydrated by a supply of oxygen, which provides an excess of oxygen to the cell. This increases the conversion rate of protons transported across the membrane and the supplied oxygen to water, which allows the limiting current density to be increased. In addition, with this supply of oxygen, it is possible to take advantage of this excess of oxygen without the economic penalty of discarding products from the cell associated with other ways of hydrating the membrane.

To achieve the foregoing solutions, and in accordance with the purposes of the invention as embodied and broadly described herein, there is provided an electrochemical cell for directly producing essentially dry halogen gas from essentially anhydrous hydrogen halide. The electrochemical cell comprises means for oxidizing molecules of essentially anhydrous hydrogen halide to produce essentially dry halogen gas and protons, cation-transporting means for transporting the protons therethrough, where the oxidizing means is disposed in contact with one side of the cation-transporting means, means for reducing the transported protons, wherein the reducing means is disposed in contact with the other side of the cation-transporting means, and means for supplying water to the cation-transporting means at the other side of the cation-transporting means.

Further in accordance with the purposes of the invention, there is provided a system for recycling a released fluid from an electrochemical cell for directly producing essentially dry halogen gas from essentially anhydrous hydrogen halide. The system includes an electrochemical cell which comprises means for oxidizing molecules of essentially anhydrous hydrogen halide to produce essentially dry halogen gas and protons; cation-transporting means for transporting the protons therethrough, where the oxidizing means is disposed in contact with one side of the cation-transporting means; means for reducing the transported protons, wherein the reducing means is disposed in contact with the other side of the cation-transporting means, inlet means for supplying water to the cation-transporting means and outlet means for releasing a fluid from reducing means; and means for recycling the fluid back to the cation-transporting means.

Further in accordance with the purposes of the invention, there is provided a process for directly producing essentially dry halogen gas from essentially anhydrous hydrogen halide, wherein molecules of essentially anhydrous hydrogen halide are fed to an inlet of the electrochemical cell and are transported to an anode of the cell; the molecules of the essentially anhydrous hydrogen halide are oxidized at the anode to produce essentially dry halogen gas and protons; the protons are transported through a cation-transporting membrane of the cell; the transported protons are reduced at a cathode of the electrochemical cell; and water is supplied to the membrane by feeding a humidified gas stream to the membrane.

Alternatively, the process of the present invention may be described as a process for directly producing essentially dry halogen gas from essentially anhydrous hydrogen halide, wherein current is supplied to an electrochemical cell; molecules of essentially anhydrous hydrogen halide are fed to an inlet of the electrochemical cell and are transported to an anode of the cell; the molecules of the essentially anhydrous hydrogen halide are oxidized at the anode to produce essentially dry halogen gas and protons; the protons are transported through a cation-transporting membrane of the cell; the transported protons are reduced at a cathode of the electrochemical cell; water is supplied to the membrane at the cathode and the water is transported by diffusion towards the anode; the transported protons drag the water in the membrane towards the cathode; and the amount of current required to achieve a balance between the water transported by diffusion toward the anode and dragged by the proton transport toward the cathode is controlled by adjusting the amount of water supplied to the membrane.

In either process, a fluid is released from the cell and may be recycled back to the membrane.

BRIEF DESCRIPTION OF THE DRAWINGS

FIG. 1A is a cut-away, top cross-sectional view of the anode and cathode mass flow fields as shown in FIG. 1.

DESCRIPTION OF THE PREFERRED EMBODIMENTS

Reference will now be made in detail to the present preferred embodiments of the invention as illustrated in the accompanying drawings.

In accordance with a first, second, third and fourth embodiment of the present invention, there is provided an electrochemical cell for the direct production of essentially dry halogen gas from anhydrous hydrogen halide. Such a cell is shown generally at 10 in FIG. 1. The cell of the present invention will be described with respect to a preferred embodiment of the present invention, which directly produces essentially dry chlorine gas from essentially anhydrous hydrogen chloride. This cell may alternatively be used to produce other halogen gases, such as bromine, fluorine and iodine from a respective anhydrous hydrogen halide, such as hydrogen bromide, hydrogen fluoride and hydrogen iodide. The term "direct" means that the electrochemical cell obviates the need to remove water from the halogen gas produced or the need to convert essentially anhydrous hydrogen halide to aqueous hydrogen halide before electrochemical treatment. In the first embodiment, chlorine gas, as well as hydrogen, is produced in this cell. In a second embodiment, water, as well as chlorine gas, is produced by this cell, as will be explained more fully below.

Figure 1:
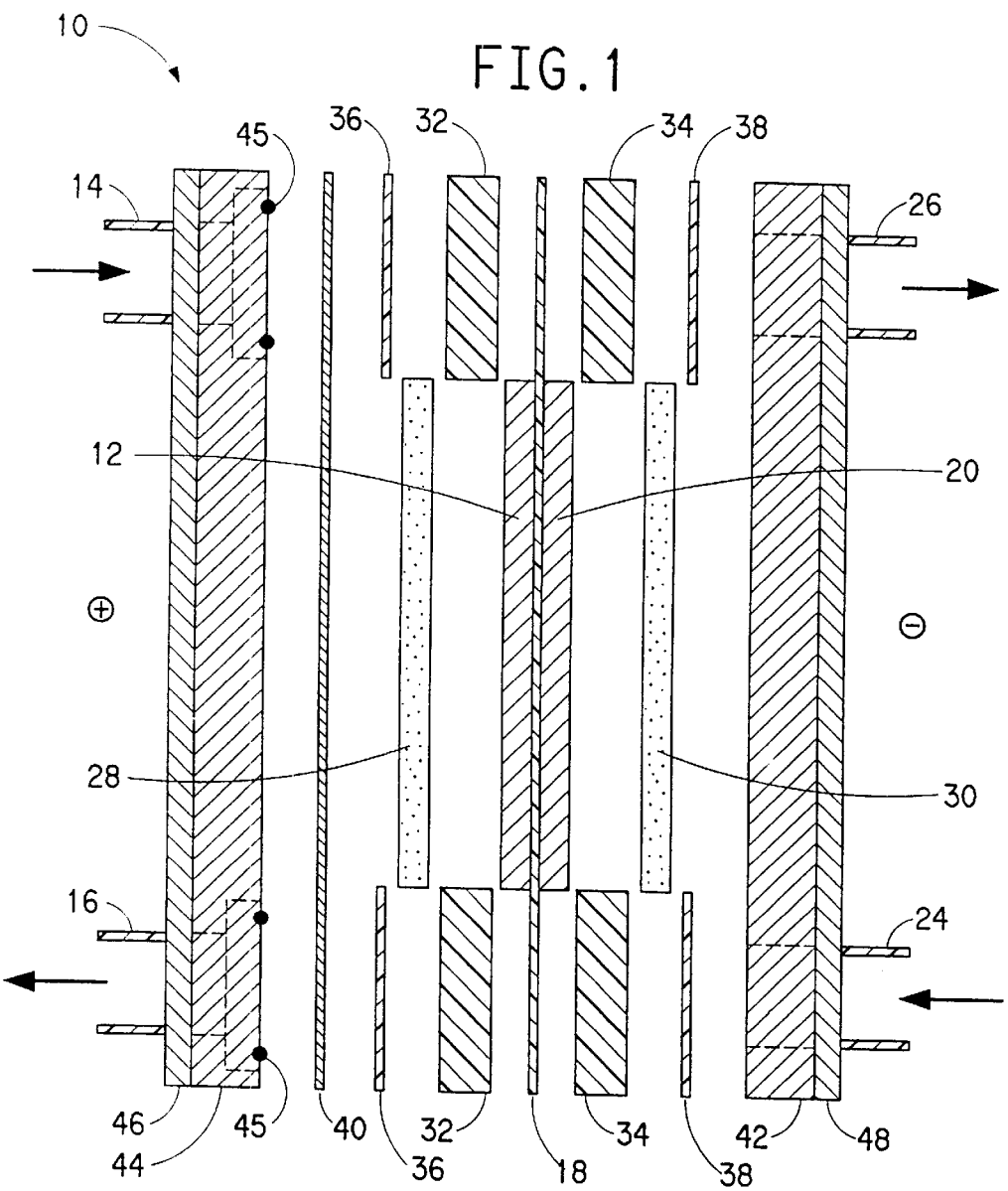
FIG. 1 is a cross-sectional view of an electrochemical cell for producing halogen gas from anhydrous hydrogen halide according to any of the first, second, third or fourth embodiments of the present invention.

The electrochemical cell of the first through fourth embodiments comprises means for oxidizing molecules of essentially anhydrous hydrogen halide to produce essentially dry halogen gas and protons. The oxidizing means is an electrode, or more specifically, an anode 12 as shown in FIGS. 1 and 1A. On the anode side, electrochemical cell 10 has an anode-side inlet 14 and an anode-side outlet 16. Since in the preferred embodiment, anhydrous HCl is carried through the inlet, and chlorine gas is carried through the outlet, the inlet and the outlet may be lined with a a copolymer of tetrafluoroethylene with (perfluoro)alkyl-vinyl either, sold under the trademark TEFLON® PFA (hereinafter referred to as "PFA", by E. I. du Pont de Nemours and Company of Wilmington, Del. (hereinafter referred to as "DuPont").

The electrochemical cell of the first through fourth embodiments also comprises cation-transporting means for transporting the protons therethrough, where one side of the oxidizing means is disposed in contact with one side of the cation-transporting means. Preferably, the cation-transporting means is a cation-transporting membrane 18 as shown in FIGS. 1 and 1A. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type $-CF_2CFRSO_3H$ and $-OCF_2CF_2CF_2SO_3H$, where R is an F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)$ $OCF_2CF_2SO_3H$. Sometimes those resins may be in the form that has pendant $-SO_2F$ groups, rather than $-SO_3H$ groups. The sulfonyl fluoride groups can be hydrolyzed with potassium hydroxide to $-SO_3K$ groups, which then are exchanged with an acid to $-SO_3H$ groups. Suitable perfluorinated cationic membranes, which are made of hydrated, copolymers of polytetrafluoroethylene and poly-sulfonyl fluoride vinyl ether-containing pendant sulfonic acid groups, are offered by DuPont under the trademark "NAFION" (hereinafter referred to as NAFION®). In particular, NAFION® membranes containing pendant sulfonic acid groups include NAFION® 117, NAFION® 324 and NAFION® 417. The first type of NAFION® is unsupported and has an equivalent weight of 1100 g, equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g NAFION® 324 has a two-layer structure, a 125 µm-thick membrane having an equivalent weight of 1100 g, and a 25 µm-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x \cdot Al_2O_3$, in which x ranges from 5 ($\beta''$-alumina) to 11 ($\beta$-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

The electrochemical cell of the first through fourth embodiments also comprises an electrode, or more specifically, cathode 20, where the cathode is disposed in contact with the other side (as opposed to the side which is in contact with the anode) of membrane 18 as illustrated in FIGS. 1 and 1A. Cathode 20 has a cathode-side inlet 24 and a cathode-side outlet 26 as shown in FIG. 1. Since in the preferred embodiment, anhydrous HCl is processed, and since some chlorides pass through the membrane and consequently, HCl is present on the cathode-side of the cell, the cathode inlet and the outlet may be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen chloride are transported to the surface of the anode through anode-side inlet 14. The molecules of the anhydrous hydrogen chloride are oxidized to produce essentially dry chlorine gas and protons. The essentially dry chlorine gas exits through anode-side outlet 16 as shown in FIG. 1. The protons, $H^+$, are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electrochemically active material may comprise a catalyst material on a support material. The support material may comprise particles of carbon and particles of polytetrafluoroethylene, or PTFE, a tetrafluoroethylene fluoropolymer resin which is sold under the trademark "TEFLON" (hereinafter referred to as "PTFE"), commercially available from DuPont. The electrochemically active material may be bonded by virtue of the PTFE to a support structure, or gas diffusion layer, of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 $mg/cm^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® ionomer to enhance the catalyst-ionomer surface contact and to act as a binder to the NAFION® membrane sheet. With such a system, loadings as low as 0.017 mg active material per $cm^2$ have been achieved.

The membrane of the present invention serves as the electrolyte in which the protons constitute the current. The membrane must be in a sufficient state of hydration in order to act as a proton conductor. Electro-osmotic drag occurs in the membrane, where protons drag water in the direction of current flow. This leads to the development of a concentration gradient of water within the membrane. The conductivity of a membrane is directly related to the water content in the membrane and decreases at low water content. Limiting current occurs when the concentration of water within the membrane reaches a value that will no longer support additional proton conduction. Thus, limiting current density can develop when the conductivity decreases due to low water concentrations.

Therefore, according to the present invention, water, in the form of a humidified gas stream or liquid water, is supplied to the membrane at the cathode. This is necessary in order to achieve efficient proton transport. In the first three embodiments, which have a hydrogen-producing cathode, the hydration of the membrane is accomplished by the introduction of either liquid water in the first embodiment, or a gas stream comprising hydrogen or nitrogen, respectively, in the second and third embodiments, to the membrane at the cathode-side of the membrane. In the fourth embodiment, which has a water-producing cathode, membrane hydration is accomplished by the production of water at the cathode, as well as the introduction of a humidified gas stream comprising oxygen at the cathode-side of the membrane, which produces water. Although hydrogen, nitrogen and oxygen are described herein, it is within the scope of the present invention to use humidified gas streams comprising other gases.

The water at the cathode side of the membrane is transported by diffusion towards the anode. Additionally, the transported protons drag the water in the membrane, which includes water already present in the membrane to begin with, towards the cathode. Applicants have found that the amount of current required to achieve a balance between the water transported by diffusion toward the anode and dragged by the proton transport toward the cathode, at which point limiting current occurs, may be controlled by adjusting the amount of water supplied to the membrane at the cathode. Consequently, with the present invention, limiting current may be controlled. This is especially desirable where it is necessary to lower or raise limiting current in order to compensate for changes in the amount of anhydrous hydrogen halide which needs to be processed. This may change in response to changes in manufacturing rates of manufacturers which produce hydrogen chloride.

In order to adjust the amount of water supplied to the membrane, the electrochemical cell of the first through fourth embodiments also comprises inlet means for supplying water to the cation-transporting means at the other side of the cation-transporting means. Preferably, the inlet means comprises a cathode-side inlet 24 as shown in FIG. 1 which supplies water, in various forms as will be explained below, to the side of the membrane which is disposed in contact with the cathode. The electrochemical cell also comprises outlet means for releasing a fluid from the reducing means at the other side of the cation-transporting means. Preferably, the outlet means comprises a cathode-side outlet 26 as shown in FIG. 1, which releases a fluid from the cathode at the side of the membrane which is disposed in contact with the cathode. Since in the preferred embodiment, anhydrous HCl is processed, and since there may be some chloride passing through the membrane to the cathode-side of the cell, the cathode-side inlet and outlet are preferably lined with PFA.

The electrochemical cell of the first through fourth embodiments further comprises an anode flow field 28 disposed in contact with the anode and a cathode flow field 30 disposed in contact with the cathode. The flow fields are electrically conductive, and act as both mass and current flow fields. More specifically, the mass flow fields may include a plurality of anode flow channels 29 and a plurality of cathode flow channels 31 as shown in FIG. 1A. Anode flow field and channels 29 direct reactants, such as anhydrous HCl, and products, such as essentially dry chlorine gas, from the anode. Cathode flow field 30 and channels 31 direct catholyte, such as liquid water in the first embodiment, or a humidified gas stream in the second through fourth embodiments to the cathode and products, such as hydrogen vapor, liquid water and HCl dissolved in the water in the first embodiment, hydrogen and hydrogen halide, in the form of vapor, in the second embodiment, hydrogen, nitrogen, water and hydrogen halide, all in the form of vapor, in the third embodiment, and oxygen, water and hydrogen halide, all in the form of vapor, in the fourth embodiment. The anode and the cathode mass flow fields may comprise grooved porous graphite paper. The flow fields may also be made of a porous carbon in the form of a foam, cloth or matte.

The electrochemical cell of the first through fourth embodiments may also comprise an anode mass flow manifold 32 and a cathode mass flow field manifold 34 as shown in FIG. 1. The purpose of such manifolds is to bring anolyte to and products from the anode, and catholyte to and products from the cathode. In addition, the manifolds form a frame around the anode mass flow field and the anode, and the cathode mass flow field and the cathode, respectively. These manifolds are preferably made of a corrosion resistant material, such PFA. A gasket 36, 38, also contributes to forming a frame around the respective anode and cathode mass flow fields. These gaskets are preferably also made of a corrosion resistant material, such as PTFE.

The electrochemical cell of the first through fourth embodiments also comprises an anode current bus 46 and a cathode current bus 48 as shown in FIG. 1. The current buses conduct current to and from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the cell components to the right of current bus 46 as shown in FIG. 1, including current bus 48, from which it returns to the voltage source. The current buses are made of a conductor material, such as copper.

The electrochemical cell of the first through fourth embodiments further comprises a respective current distributor disposed in contact with a respective flow field. An anode current distributor 40 is disposed in contact with anode flow field 28, and a cathode current distributor 42 is disposed in contact with cathode flow field 30. The anode current distributor collects current from the anode bus and distributes it to the anode by electronic conduction. The cathode current distributor collects current from the cathode and distributes it to the cathode bus. The anode and the cathode current distributors preferably each comprise a non-porous layer. The anode current distributor provides a barrier between the anode current bus and the anode, as well as between the current bus and the anhydrous hydrogen halide, such as hydrogen chloride, and the halogen gas, such as chlorine. The cathode current distributor provides a barrier between the cathode current bus and the cathode, as well as between the cathode current bus and the hydrogen halide. This barrier is desirable, as there is some migration of hydrogen halide through the membrane. The current distributors of the present invention may be made of a variety of materials, and the material used for the anode current distributor need not be the same as the material used for the cathode current distributor. In one instance, the anode current distributor is made of platinized tantalum, and the cathode current distributor is made of a nickel-based alloy, such as UNS10665, sold as HASTELLOY® B-2, by Haynes, International.

In the first through fourth embodiments, the electrochemical cell also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. The cathode current distributor acts as a corrosion-resistant structural backer on the cathode side. This piece can be drilled and tapped to accept the PFA fitting, which is used for the inlet and outlet.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell, and current buses are placed on the outside of the stack.

In any of the first through fourth embodiments, the electrochemical cell can be operated over a wide range of temperatures. Room temperature operation is an advantage, due to the ease of use of the cell. However, operation at elevated temperatures provides the advantages of improved kinetics and increased electrolyte conductivity. In addition, it should be noted also that one is not restricted to operate the electrochemical cell of any of the first through fourth embodiments at atmospheric pressure. The cell could be run at differential pressure gradients, which change the transport characteristics of water or other components in the cell, including the membrane.

The electrochemical cell of any of the embodiments of the present invention can be operated at higher temperatures at a given pressure than electrochemical cells operated with aqueous hydrogen chloride of the prior art. This affects the kinetics of the reactions and the conductivity of the NAFION®. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C.

Figure 2:
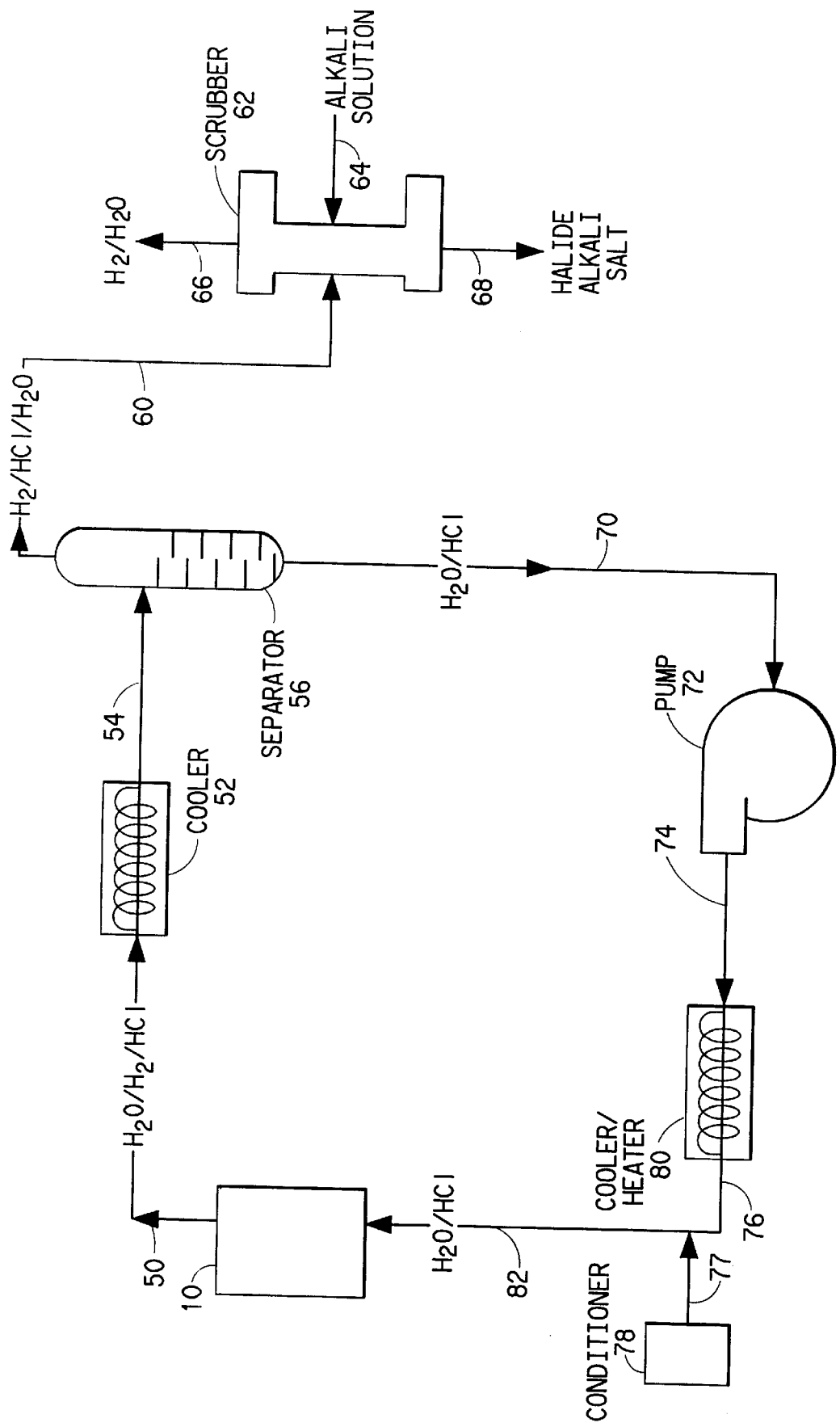
FIG. 2 is a schematic diagram of a system for producing essentially dry halogen gas from anhydrous hydrogen halide using the electrochemical cell of FIG. 1 and for recycling a fluid released from the cell back to the membrane, where liquid water is added to the cathode-side inlet of the cell.

Further in accordance with the first embodiment of the present invention, there is provided a system and a process for recycling a fluid released from an electrochemical cell used for the direct production of essentially dry halogen gas from essentially anhydrous hydrogen halide. The system of the first embodiment is shown in FIG. 2 and comprises an electrochemical cell 10, which is the same as electrochemical cell 10 as described above. In the first embodiment, liquid water is fed to cathode-side inlet 24 as shown in FIG. 1, and subsequently to the cathode-side of the membrane. Cathode-side outlet 26 releases a fluid, which in the first embodiment comprises water ($H_2O$) in the form of a liquid, hydrogen ($H_2$) in the form of vapor, and hydrogen halide, such as hydrogen chloride, which is dissolved in the water.

The system for recycling a released fluid from an electrochemical cell used for directly producing essentially dry halogen gas from essentially anhydrous hydrogen halide further comprises means for recycling the released fluid back to the cation-transporting means. More specifically, the recycling means comprises a recycling loop which recycles the released fluid back to the membrane at the cathode-side of the membrane. The recycling means may comprise a cooler for cooling the released fluid. As shown in FIG. 2, hydrogen ($H_2$) in the form of a vapor, water ($H_2O$) in the form of a liquid, and a hydrogen halide, such as hydrogen chloride, which is dissolved in the water, which have been released from the cell, are carried through a line 50 to a cooler 52 which cools the released fluid. The recycling means may also comprise a separator for removing a portion of the hydrogen halide from the released fluid. As shown in FIG. 2, after the released fluid is cooled, it is carried through a line 54 to a separator 56, which removes a portion of the hydrogen chloride dissolved in water ($H_2O$) through a line 70 as shown in FIG. 2. The recycling means may further comprise a scrubber for removing another portion of the hydrogen halide. Specifically, hydrogen ($H_2$), hydrogen chloride (HCl) and water ($H_2O$), all in the form of vapor, are carried through a line 60 to a scrubber 62. An alkali solution is added to scrubber 62 through line 64, so that the scrubber removes another portion of the hydrogen chloride through a line 68, as a halide alkali salt. Hydrogen ($H_2$) and water ($H_2O$) both in the form of vapor, which may be discarded or used in another process, are vented from scrubber 62 through a line 66.

In the first embodiment of FIG. 2, the recycling means may also comprise a pump for pumping the released fluid through the recycling loop back to the membrane. As shown in FIG. 2, liquid water ($H_2O$) and hydrogen chloride (HCl), dissolved in the water, are carried through line 70 to a pump 72. The water and hydrogen chloride are then carried out of pump 72 through a line 74. The recycling means of the first embodiment may also comprise a temperer, shown as a heater/cooler 80 in FIG. 2, which tempers the released fluid. Temperer 80 may either heat or cool the released fluid, depending on the desired temperature for the electrochemical cell. The heated or cooled fluid is released from temperer 80 through a line 76. The recycling means of the first embodiment may further comprise a conditioner 78 for conditioning the released fluid. Conditioner 78 supplies heat and water through a line 77 to the released fluid. Liquid water ($H_2O$), with a small amount of residual hydrochloric acid, is carried through a line 82 back to electrochemical cell 10, where it is used to continuously supply liquid water to the membrane.

Figure 3:
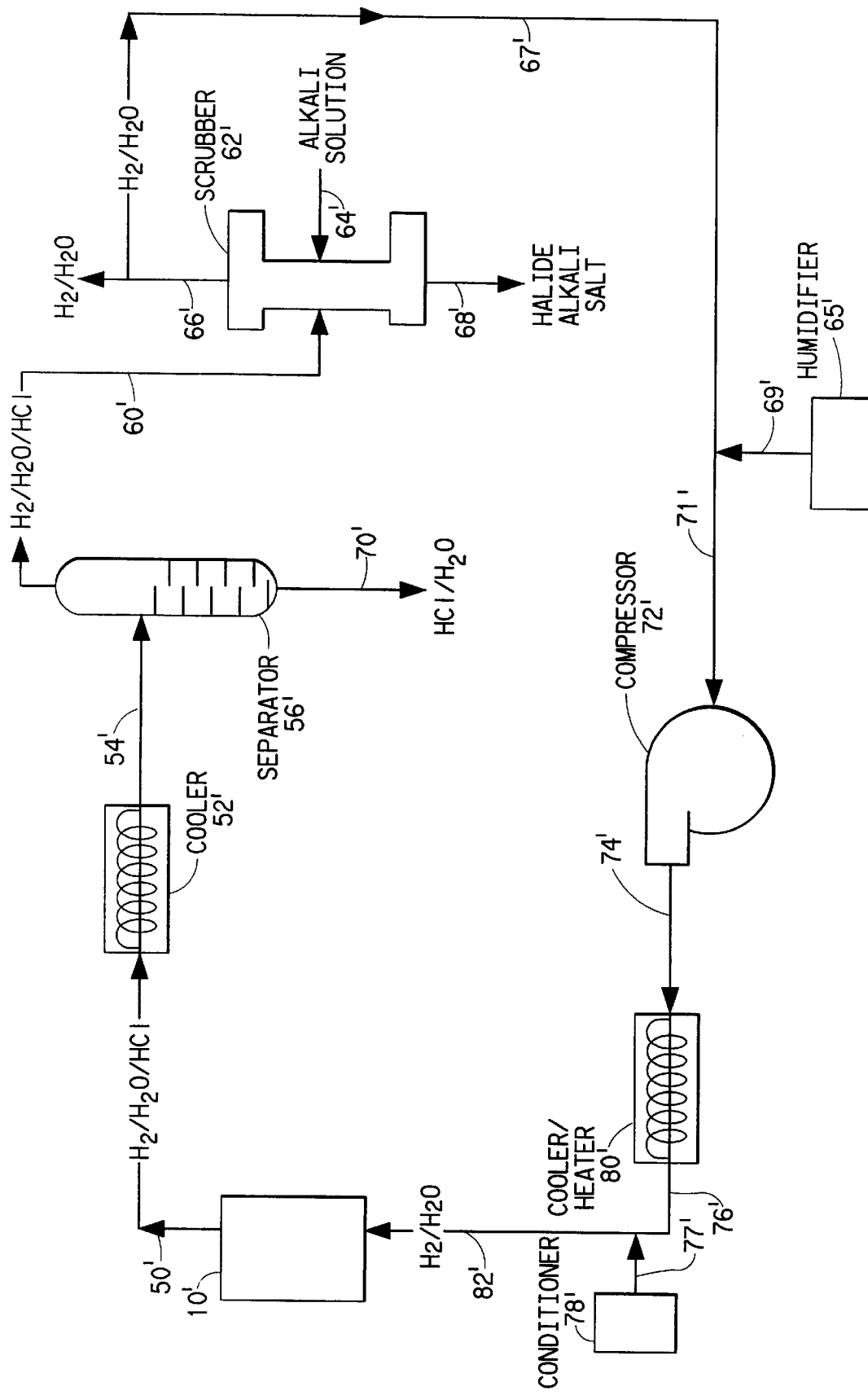
FIG. 3 is a schematic diagram of a system for producing essentially dry halogen gas from anhydrous hydrogen halide using the electrochemical cell of FIG. 1 and for recycling a fluid released from the cell back to the membrane, where a humidified gas stream comprising hydrogen is added to the cathode-side inlet of the cell.

Further in accordance with the second embodiment of the present invention, there is provided a system and a process for recycling a released fluid from an electrochemical cell used for the direct production of essentially dry halogen gas from essentially anhydrous hydrogen halide. The system of the second embodiment is shown in FIG. 3 and comprises an electrochemical cell 10', which is the same as electrochemical cell 10 as described above. In the second embodiment, a humidified gas stream comprising hydrogen is fed to cathode-side inlet 24 of the cell as shown in FIG. 1. The humidified gas stream comprises primarily hydrogen. However, in practice, traces of other gases, except oxygen, may be included in the gas stream of the second embodiment. Cathode-side outlet 26 as shown in FIG. 1 releases a fluid from the cathode, which in the second embodiment comprises water ($H_2O$), hydrogen ($H_2$), and hydrogen halide, such as HCl, all in the form of vapor.

The system for recycling a released fluid from an electrochemical cell used for the direct production of essentially dry halogen gas from essentially anhydrous hydrogen halide of the second embodiment further comprises means for recycling the released fluid back to the cation-transporting means. More specifically, the recycling means comprises a recycling loop which recycles the released fluid back to the membrane at the cathode-side of the membrane. The recycling means of the second embodiment may comprise a cooler for cooling the released fluid. As shown in FIG. 3, the water ($H_2O$), hydrogen ($H_2$) and hydrogen halide, all in the form of vapor, are carried through a line 50' to a cooler 52' which cools the released fluid. As noted above, the released fluid comprises hydrogen halide, specifically hydrogen chloride in a preferred embodiment, and the recycling means may also comprise a separator for removing a portion of the hydrogen halide from the released fluid. As shown in FIG. 3, after the released fluid is cooled, it is carried through a line 54' to a separator 56', which removes a portion of the hydrogen chloride, as well as water vapor, through a line 70' as shown in FIG. 3. This HCl and water are discarded. The recycling means may further comprise a scrubber for removing another portion of the hydrogen halide. Specifically, hydrogen ($H_2$), hydrogen chloride (HCl) and water ($H_2O$), all in the form of vapor, are carried through a line 60' to a scrubber 62'. An alkali solution is added to scrubber 62' through a line 64', so that the scrubber removes another portion of the hydrogen chloride through a line 68', as a halide alkali salt. Hydrogen vapor ($H_2$) and water vapor ($H_2O$), which may be discarded or used in another process, are vented from scrubber 62' through a line 66'. Hydrogen vapor ($H_2$) and water vapor ($H_2O$) are carried away from scrubber 62' by a line 67'.

In the second embodiment of FIG. 3, the recycling means may also comprise a humidifier for humidifying the released fluid. A humidifier 65' humidifies the released fluid, which is hydrogen vapor and water vapor, with water, in either liquid or vapor form, through a line 69'. The humidified hydrogen and water vapor are carried away from line 69' by a line 71'. The recycling means may also comprise a compressor 72' for compressing the released fluid. The water and hydrogen are then carried out of compressor 72' through a line 74'. The recycling means of the second embodiment may also comprise a temperer, shown as a heater/cooler 80' in FIG. 2, which tempers the released fluid. Temperer 80' may either heat or cool the released fluid, depending on the desired temperature of the cell. The water and hydrogen vapor are then carried through a line 76'. The recycling means of the second embodiment may further comprise a conditioner 78' for conditioning, or supplying heat and water, to the released fluid, which is still hydrogen vapor and water vapor, through a line 77'. In the second embodiment, either a humidifier or a conditioner is used, but not both. The hydrogen and water vapor are carried through a line 82' back to electrochemical cell 10', where they are used to continuously supply a humidified gas stream, which includes hydrogen, to the membrane.

Figure 4:
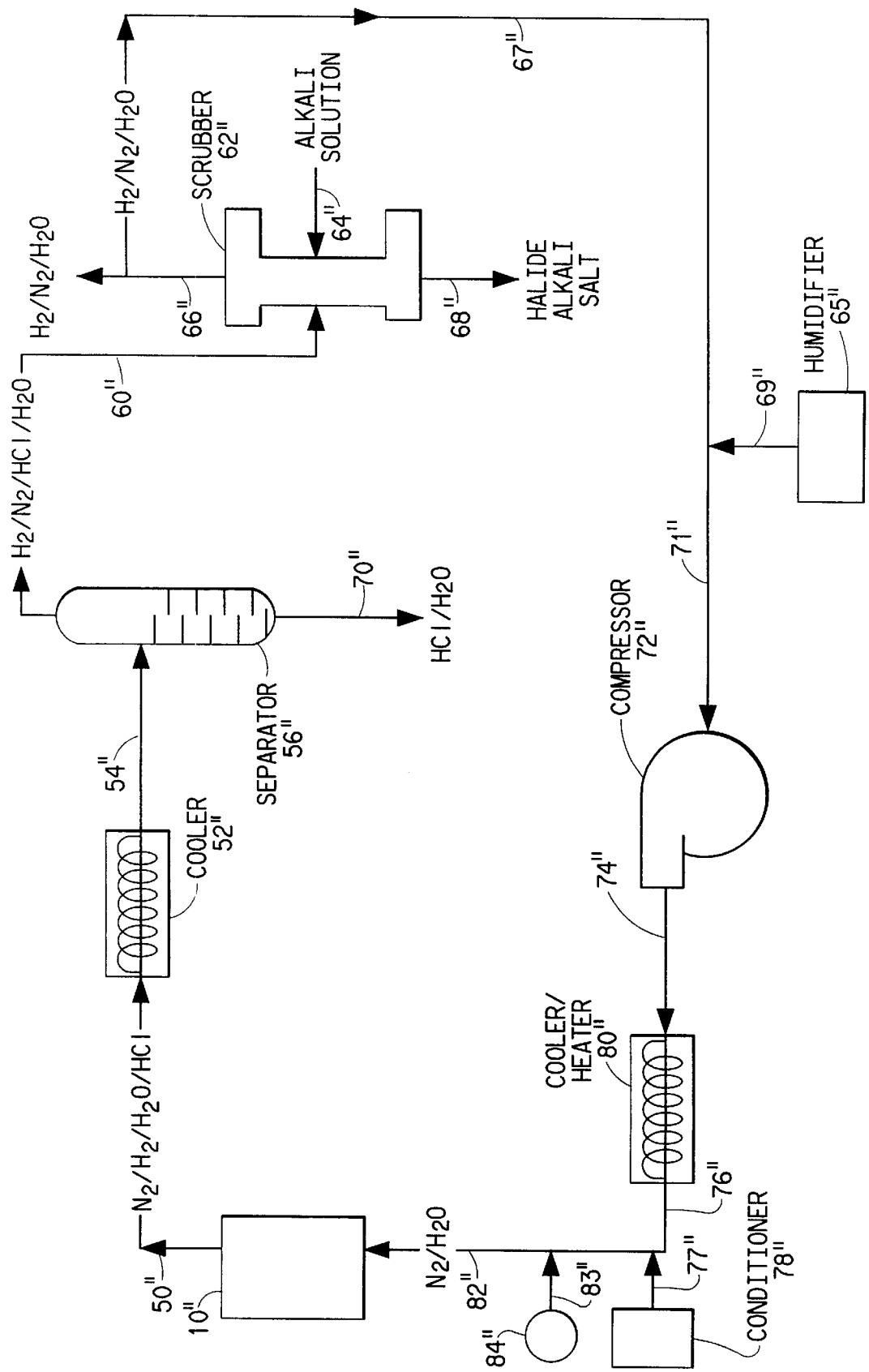
FIG. 4 is a schematic diagram of a system for producing essentially dry halogen gas from anhydrous hydrogen halide using the electrochemical cell of FIG. 1 and for recycling a fluid released from the cell back to the membrane, where a humidified gas stream comprising oxygen is added to the cathode-side inlet of the cell.

Further in accordance with the third embodiment of the present invention, there is provided a system and a process for recycling a released fluid from an electrochemical cell used for the direct production of essentially dry halogen gas from essentially anhydrous hydrogen halide. The system of the third embodiment is shown in FIG. 4 and comprises an electrochemical cell 10", which is the same as electrochemical cell 10 as described above. In the third embodiment, a humidified gas stream comprising nitrogen is fed to cathode-side inlet 24 as shown in FIG. 1. The humidified gas comprises primarily nitrogen. However, in practice, traces of other gases other than oxygen may be included in the gas stream. Cathode-side outlet 26 as shown in FIG. 1 releases a fluid from the cathode through a line 50", which in the third embodiment comprises nitrogen ($N_2$), hydrogen ($H_2$), water ($H_2O$), and hydrogen halide, such as hydrogen chloride (HCl), all in the form of vapor, as shown in FIG. 4.

The system for recycling a released fluid from an electrochemical cell used for the direct production of essentially dry halogen gas from essentially anhydrous hydrogen halide of the third embodiment further comprises means for recycling the released fluid back to the cation-transporting means. More specifically, the recycling means comprises a recycling loop which recycles the released fluid back to the membrane at the cathode-side of the membrane. The recycling means of the third embodiment may comprise a cooler for cooling the released fluid. As shown in FIG. 4, the water ($H_2O$), nitrogen ($N_2$), hydrogen ($H_2$) and hydrogen halide, such as NCl, all in the form of a vapor, are carried through line 50" to a cooler 52" which cools the released fluid. As noted above, the released fluid comprises hydrogen halide, specifically hydrogen chloride in a preferred embodiment, and the recycling means may also comprise a separator for removing a portion of the hydrogen halide from the released fluid. As shown in FIG. 4, after the released fluid is cooled, it is carried through a line 54" to a separator 56", which removes a portion of the hydrogen chloride and the water ($H_2O$) in the form of liquid through a line 70". The recycling means may further comprise a scrubber for removing another portion of the hydrogen halide. Specifically, hydrogen ($H_2$), nitrogen ($N_2$), hydrogen chloride (HCl) and water ($H_2O$), all in the form of vapor, are carried through a line 60" to a scrubber 62". An alkali solution is added to scrubber 62" through a line 64", so that the scrubber removes another portion of the hydrogen chloride through a line 68", as a halide alkali salt. In this third embodiment, the nitrogen and the hydrogen and the water vapor cannot be separated. Thus, a portion of the hydrogen ($H_2$), nitrogen ($N_2$) and water ($H_2O$), all in the form of vapor, is vented through a line 66". Another portion of the hydrogen ($H_2$), nitrogen ($N_2$) and water ($H_2O$), all in the form of vapor, is carried away from scrubber 62" by a line 67".

In the third embodiment of FIG. 4, the recycling means may also comprise a humidifier for humidifying the released fluid. A humidifier 65" humidifies the released fluid, which is hydrogen vapor, nitrogen vapor and water vapor, with water, in either liquid or vapor form through a line 69". The recycling means may also comprise a compressor 72" for compressing the released fluid. The water, hydrogen and nitrogen, all in the form of vapor, are then carried out of compressor 72" through a line 74". The humidified fluid is carried away from line 69" by a line 71". The recycling means of the third embodiment may also comprise a temperer, shown as heater/cooler 80" in FIG. 4, which tempers the released fluid. The water, hydrogen and nitrogen are then carried through a line 74" to temperer 80". Temperer 80" may either heat or cool the released fluid, depending on the desired temperature of the cell. The heated or cooled fluid is released from temperer 80" through a line 76". The recycling means of the second embodiment may further comprise a conditioner 78" for supplying heat and water to the released fluid through a line 77". As in the second embodiment above, either a humidifier or a conditioner is used in the recycle loop of the third embodiment, but not both. In addition, in the third embodiment, additional nitrogen is supplied from a source 84" to the cell through a line 83", since nitrogen is being lost in the loop through line 66". However, it should be noted that the nitrogen may be added anywhere in the recycle loop. Nitrogen ($N_2$) and water vapor ($H_2O_{(vapor)}$) are carried through a line 82" back to electrochemical cell 10", where they are used to continuously supply a humidified gas stream, which includes nitrogen, to the membrane at the cathode-side of the membrane.

Figure 5:
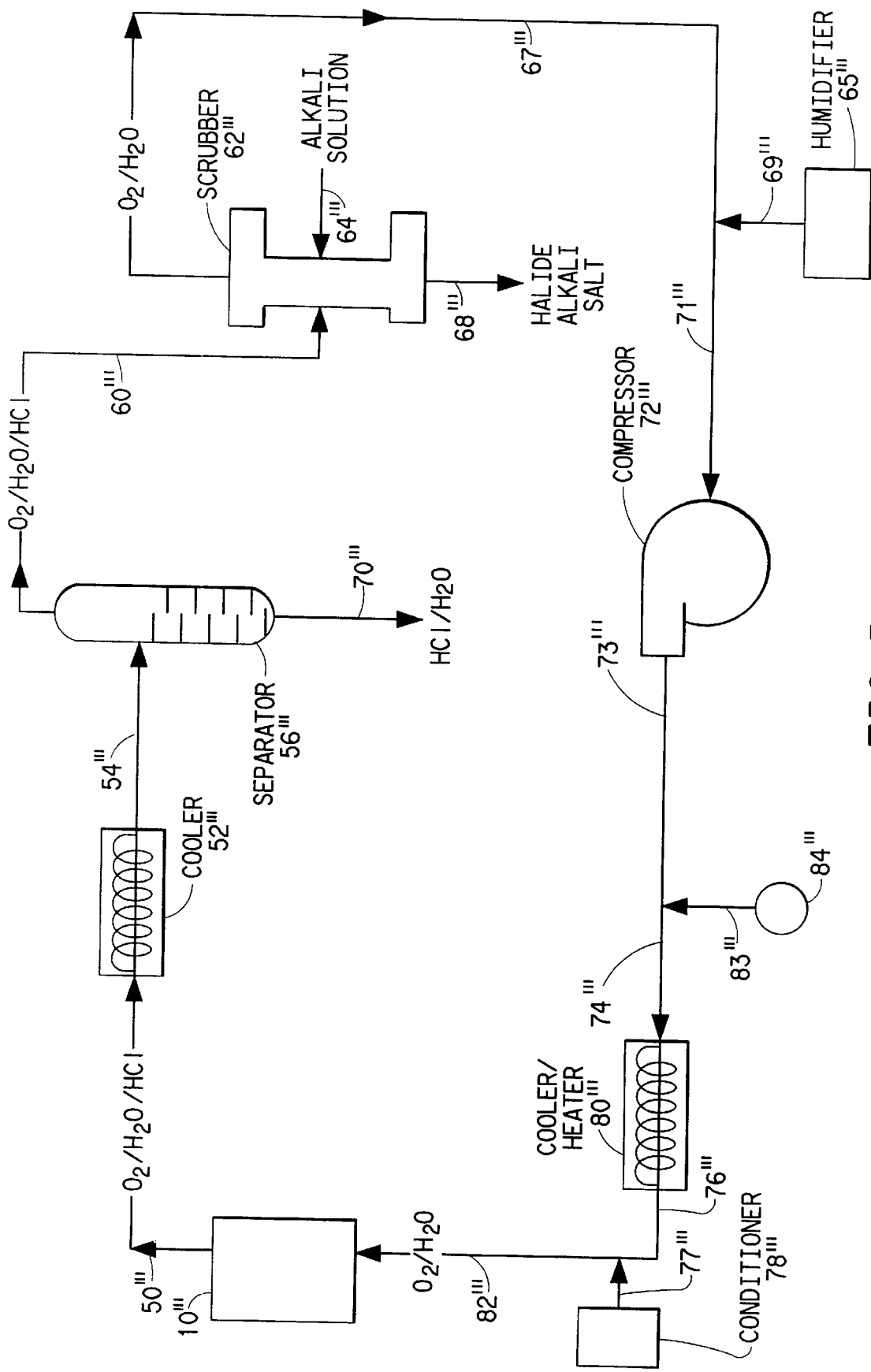
FIG. 5 is a schematic diagram of a system for producing essentially dry halogen gas from anhydrous hydrogen halide using the electrochemical cell of FIG. 1 and for recycling a fluid released from the cell back to the membrane, where a humidified gas stream comprising oxygen is added to the cathode-side inlet of the cell.

Further in accordance with the fourth embodiment of the present invention, there is provided a system and a process for recycling a released fluid from an electrochemical cell used for the direct production of essentially dry halogen gas from essentially anhydrous hydrogen halide. The system of the fourth embodiment is shown in FIG. 5 and comprises an electrochemical cell 10'", which is the same as electrochemical cell 10 as described above. In the fourth embodiment, a humidified gas stream comprising oxygen is fed to cathode-side inlet 24 as shown in FIG. 1. The humidified gas comprises primarily oxygen. However, in practice, traces of other gases, not including hydrogen, but including nitrogen, may be in the gas stream. Cathode-side outlet 26 as shown in FIG. 1 releases a fluid from the cathode through a line 50'", which in the fourth embodiment comprises oxygen ($O_2$) water ($H_2O$) and hydrogen halide, such as hydrogen chloride (HCl), all in the form of vapor, as shown in FIG. 5.

The system for recycling a released fluid from an electrochemical cell used for the direct production of producing essentially dry halogen gas from essentially anhydrous hydrogen halide of the fourth embodiment further comprises means for recycling the released fluid back to the cation-transporting means. More specifically, the recycling means comprises a recycling loop which recycles the released fluid back to the membrane at the cathode-side of the membrane. The recycling means of the third embodiment may comprise a cooler for cooling the released fluid. As shown in FIG. 5, water, (H₂O), oxygen (O₂) and hydrogen chloride (HCl), all in the form of vapor, are carried through a line 50''' to a cooler 52''' which cools the released fluid. As noted above, the released fluid comprises hydrogen halide, and preferably, hydrogen chloride, and the recycling means may also comprise a separator for removing a portion of the hydrogen halide from the released fluid. As shown in FIG. 5, after the released fluid is cooled, it is carried through a line 54''' to a separator 56''', which removes a portion of the hydrogen chloride and the water (H₂O), in the form of liquid, through a line 70'''. The recycling means may further comprise a scrubber for removing another portion of the hydrogen halide. Specifically, oxygen (O₂) hydrogen chloride (HCl) and water (H₂O), all in the form of vapor, are carried through a line 60''' to a scrubber 62'''. An alkali solution is added to scrubber 62''' through a line 64''', so that the scrubber removes another portion of the hydrogen chloride through a line 68''', as a halide alkali salt. In this fourth embodiment, a portion of the oxygen vapor (O₂) and the water vapor (H₂O) is not vented, but rather all of the oxygen and water vapor are carried away from scrubber 62''' by a line 67'''.

In the fourth embodiment of FIG. 5, the recycling means may also comprise a humidifier 65''' for humidifying the released fluid with water, in either liquid or vapor form, through a line 69'''. The humidified fluid is carried away from line 69''' by a line 71'''. The recycling means may also comprise a compressor 72''' for compressing the released fluid. The water vapor and oxygen vapor are then carried out of compressor 72''' through a line 73'''. The recycling means of the fourth embodiment may also comprise an oxygen supply for supplying additional oxygen to the released fluid. An oxygen supply 84''' as shown in FIG. 5 supplies additional oxygen to the released fluid through an oxygen supply line 83''' as shown in FIG. 5, although this line could be placed anywhere in the recycling loop. It is necessary to add oxygen in the fourth embodiment since oxygen is consumed as it reacts with protons in the cell to make water. A line 74''' carries the oxygenated released fluid away from oxygen supply line 83'''. The recycling means of the fourth embodiment may also comprise a temperer, shown as heater/cooler 80''' in FIG. 5, which tempers the released fluid. Temperer 80''' may either heat or cool the released fluid, depending on the desired temperature of the cell. A line 76''' carries the tempered fluid away from temperer 80'''. The recycling means of the fourth embodiment may further comprise a conditioner 78''' for supplying heat and water to the released fluid through a line 77'''. As in the second and third embodiments, either a humidifier or a conditioner, but not both, is used in the fourth embodiment. Oxygen (O₂) and water vapor (H₂O$_{(vapor)}$) are carried through a line 82''' back to electrochemical cell 10''', where the oxygen and the water vapor are used to continuously supply a humidified gas stream, which includes oxygen, to the membrane.

Further in accordance with the first through fourth embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane other than NAFION® should be used.

The operation of the electrochemical cell of the first three embodiments will now be described as it relates to a preferred embodiment of the process of the present invention, where the anhydrous hydrogen halide is hydrogen chloride. In operation, current flow to the anode bus, and anode current distributor 40 collects current from the anode bus and distributes it to the anode by electronic conduction. Molecules of essentially anhydrous hydrogen chloride gas are fed to an inlet, specifically anode inlet 14 of electrochemical cell 10, and are transported to the surface of anode 12 through the gas channels in the mass flow fields. In the first embodiment, liquid water as shown in FIG. 2 is added to the cell at the cathode. The water is delivered to the cathode through cathode inlet 24 and through flow channels 31 formed in cathode flow field 30. In the second embodiment, a humidified gas stream comprising hydrogen is delivered to the cathode through cathode inlet 24, and in the third embodiment, a humidified gas stream comprising nitrogen is delivered through inlet 24. This hydrates the membrane and thereby increases the efficiency of proton transport through the membrane. Molecules of the anhydrous hydrogen chloride are oxidized at the anode under the potential created by the voltage source to produce essentially dry chlorine gas at the anode, and protons (H⁺). This reaction is given by the equation:

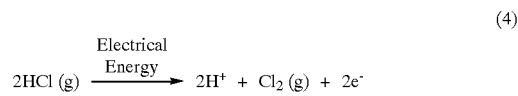

(4)

The chlorine gas exits through anode outlet 16 as shown in FIG. 1. The protons are transported through the membrane, which acts as an electrolyte. The transported protons are reduced at the cathode. This reaction is given by the equation:

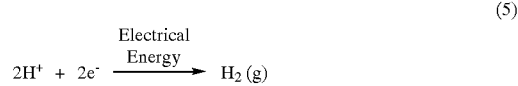

(5)

A fluid is released from the cell and is recycled back to the membrane through the respective recycle loops as described above with respect to FIGS. 2–4. Hydrogen which is evolved at the interface between the cathode and the membrane exits via cathode-side outlet 26. The hydrogen bubbles through the water and is not affected by the PTFE in the electrode. Cathode current distributor 42 collects current from cathode 20 and distributes it to cathode bus 48. In the first through third embodiments, the amount of current required to achieve a balance between the water transported by diffusion toward the anode and dragged by proton transport toward the cathode is controlled by adjusting the amount of water supplied to the membrane. In the second and third embodiments, the water supplied to the membrane is adjusted by controlling the feed rate of the humidified gas stream. Alternatively, the water supplied to the membrane is adjusted by controlling the water content of the humidified gas stream. As noted above, although humidified gas streams comprising either hydrogen or nitrogen are described, it is within the scope of the present invention to humidified gas streams comprising other gases.

In the fourth embodiment of the present invention, the electrochemical cell operates as described above, except that a humidified gas stream comprising oxygen is supplied to the cell at the cathode. Oxygen and the transported protons are reduced at the cathode to water, which is expressed by the equation:

$$\frac{1}{2}O_2(g) + 2e^- + 2H^+ \rightarrow H_2O(g) \qquad (6)$$

The water formed exits via cathode-side outlet 26 as shown in FIG. 1, along with any nitrogen and unreacted oxygen. The water also helps to maintain hydration of the membrane. The cathode-side outlet releases a fluid from the cathode, which comprises oxygen ($O_2$), water ($H_2O$) and hydrogen halide, such as hydrogen chloride (HCl), as described above with respect to FIG. 5. This fluid released from the cell is recycled back to the membrane through the recycle loop as described above with respect to FIG. 5. As in the first three embodiments, in the fourth embodiment, the amount of current required to achieve a balance between the water transported by diffusion toward the anode and dragged by proton transport toward the cathode is controlled by adjusting the amount of water supplied to the membrane. Also, in the fourth embodiment, as in the second and third embodiments, the water supplied to the membrane is adjusted by controlling the feed rate of the humidified gas stream. Alternatively, the water supplied to the membrane is adjusted by controlling the water content of the humidified gas stream. Again, although a humidified gas stream comprising oxygen is described for the fourth embodiment, it is within the scope of the present invention to use humidified gas streams comprising other gases.

In this fourth embodiment, the cathode reaction is the formation of water. This cathode reaction has the advantage of more favorable thermodynamics relative to $H_2$ production at the cathode as in the first embodiment. This is because the overall reaction in this embodiment, which is expressed by the following equation:

$$2HCl(g) + \tfrac{1}{2}O_2(g) \xrightarrow{\text{Electrical Energy}} H_2O(g) + Cl_2(g) \qquad (7)$$

involves a smaller free-energy change than the free-energy change for the overall reaction in the first three embodiments, which is expressed by the following equation:

$$2HCl(g) \xrightarrow{\text{Electrical Energy}} H_2(g) + Cl_2(g) \qquad (8)$$

Thus, the amount of voltage or energy required as input to the cell is reduced in the fourth embodiment.

Moreover, in the first three embodiments of the present invention, there is no oxygen in the cathode reaction. However, in the fourth embodiment, where oxygen is added to the cell, there is always an excess of oxygen in the cell. This means that almost all the protons transported across the membrane react with oxygen to form water. This provides a higher conversion to water. In addition, the higher the excess of oxygen, the faster the cathode reaction proceeds. Thus, the recycle loop of the fourth embodiment in particular provides a faster cathode reaction. Moreover, with the fourth embodiment, it is possible to take advantage of this excess of oxygen without the economic penalty of discarding products from the cell through a vent 66, 66' or 66" as described above for the first three embodiments.

Additional advantages and modifications will readily occur to those skilled in the art. The invention, in its broader aspects, is therefore not limited to the specific details and representative apparatus shown and described. Accordingly, departures may be made from such details without departing from the spirit or scope of the general inventive concept as defined by the appended claims and their equivalents.

What is claimed is:

1. A process for the direct production of essentially dry halogen gas from essentially anhydrous hydrogen halide, wherein:

(a) molecules of essentially anhydrous hydrogen halide are fed to an inlet of an electrochemical cell and are transported to an anode of the cell;

(b) the molecules of the essentially anhydrous hydrogen halide are oxidized at the anode to produce essentially dry halogen gas and protons;

(c) the protons are transported through a cation-transporting membrane of the cell;

(d) the transported protons are reduced at a cathode of the electrochemical cell; and (e) water is supplied to the membrane by feeding a humidified gas stream to the membrane.

2. A process for the direct production of essentially dry halogen gas from essentially anhydrous hydrogen halide, wherein:

(a) current is supplied to an electrochemical cell;

(b) molecules of essentially anhydrous hydrogen halide are fed to an inlet of the electrochemical cell and are transported to an anode of the cell;

(c) the molecules of the essentially anhydrous hydrogen halide are oxidized at the anode to produce essentially dry halogen gas and protons;

(d) the current supplied to the electrochemical cell causes the protons to be transported through a cation-transporting membrane of the cell;

(e) the transported protons are reduced at a cathode of the electrochemical cell;

(f) water from outside the cell is supplied to the membrane at the cathode and is transported by diffusion towards the anode;

(g) the transported protons drag the water in the membrane towards the cathode; and (h) the amount of current required to achieve a balance between the water transported by diffusion toward the anode and dragged by the proton transport toward the cathode is controlled by adjusting the amount of water supplied to the membrane.

3. The process of claim 2, wherein the water is supplied to the membrane by adding liquid water at the cathode.

4. The process of claim 2, wherein the water is supplied to the membrane by adding a humidified gas stream at the cathode.

5. The process of any of claims 1 or 4, wherein the water supplied to the membrane is adjusted by controlling the feed rate of the humidified gas stream.

6. The process of any of claims 1 or 4, wherein the water supplied to the membrane is adjusted by controlling the water content of the humidified gas stream.

7. The process of any of claims 1 or 4, wherein the humidified gas stream comprises hydrogen.

8. The process of any of claims 1 or 4, wherein the humidified gas stream comprises nitrogen.

9. The process of any of claims 1 or 4, wherein the humidified gas stream comprises oxygen.

10. The process of any of claims 3 or 4, wherein a fluid is released from the cell and is recycled back to the membrane.

11. The process of claim 10, wherein the released fluid is cooled before being recycled back to the membrane.

12. The process of claim 11 or claim 10 or claim 3, wherein the released fluid comprises water, hydrogen and hydrogen halide.

13. The process of claim 12, wherein a portion of the hydrogen halide and a portion of the water of the released fluid are removed from the released fluid by separation.

14. The process of claim 13, wherein another portion of the hydrogen halide and the hydrogen are sent to a scrubber, and the hydrogen is separated from the other portion of the hydrogen halide in the scrubber.

15. The process of claim 11 or claim 10, wherein the humidified gas stream comprises hydrogen.

16. The process of claim 15, wherein the released fluid comprises water, hydrogen and hydrogen halide.

17. The process of claim 16, wherein a portion of the hydrogen halide and a portion of the water of the released fluid are removed from the released fluid by separation.

18. The process of claim 17, wherein another portion of the hydrogen halide and another portion of the water of the released fluid are sent to a scrubber, and the hydrogen and the other portion of the water of the released fluid are separated from the hydrogen halide in the scrubber.

19. The process of claim 18, wherein a portion of the separated hydrogen and a portion of the separated water are vented from the scrubber.

20. The process of claim 11 or claim 10, wherein the humidified gas stream comprises nitrogen.

21. The process of claim 20, wherein the released fluid comprises hydrogen, nitrogen, water and hydrogen halide.

22. The process of claim 21, wherein a portion of the hydrogen halide and a portion of the water of the released fluid are removed from the released fluid by separation.

23. The process of claim 22, wherein another portion of the hydrogen halide, another portion of the water of the released fluid, the nitrogen and the hydrogen are sent to a scrubber, and the hydrogen, nitrogen and the other portion of the water of the released fluid are separated from the hydrogen halide by the scrubber.

24. The process of claim 23, wherein a portion of the separated hydrogen, a portion of the separated nitrogen and a portion of the separated water are vented from the scrubber.

25. The process of claim 11 or claim 10, wherein the humidified gas stream comprises oxygen.

26. The process of claim 25, wherein the released fluid comprises oxygen, water and hydrogen halide.

27. The process of claim 26, wherein a portion of the hydrogen halide and a portion of the released fluid water are removed from the released fluid by separation.

28. The process of claim 27, wherein another portion of the hydrogen halide, another portion of the water of the released fluid and the oxygen are sent to a scrubber, and the oxygen and the other portion of the water of the released fluid are separated from the hydrogen halide by the scrubber.

29. The process of claim 28, wherein all of the oxygen and all of the water are recycled to the membrane.

30. The process of claim 29, wherein an additional supply of oxygen is added to the released fluid before being recycled to the membrane.

31. The process of claim 10 or claim 4, wherein the released fluid is compressed before being recycled to the membrane.

32. The process of claim 10, wherein the released fluid is tempered before being recycled to the membrane.

33. The process of claim 10 or claim 4, wherein the released fluid is humidified with water before being recycled to the membrane.

34. The process of claim 10, wherein the released fluid is conditioned with steam before being recycled to the membrane.

35. An electrochemical cell for directly producing essentially dry halogen gas from essentially anhydrous hydrogen halide, comprising:
    (a) means for oxidizing molecules of essentially anhydrous hydrogen halide to produce essentially dry halogen gas and protons;
    (b) cation-transporting means for transporting the protons therethrough, wherein the oxidizing means disposed in contact with one side of the cation-transporting means;
    (c) means for reducing the transported protons, wherein the reducing means is disposed in contact with the other side of the cation-transporting means; and
    (d) means for supplying water from outside the cell to the cation-transporting means at the other side of the cation-transporting means.

36. The electrochemical cell of claim 35, wherein the oxidizing means is an anode, the reducing means is a cathode, and the cation-transporting means is a membrane.

37. The electrochemical cell of claim 36, wherein the means for supplying water to the membrane comprises an inlet disposed at the cathode-side of the membrane.

38. The electrochemical cell of claim 37, further comprising an anode mass flow field disposed in contact with the anode, and a cathode mass flow field disposed in contact with the cathode.

39. The electrochemical cell of claim 38, wherein the anode and the cathode mass flow fields have flow channels formed therein, and the flow channels of the cathode mass flow field are disposed in fluid communication with the inlet, and further wherein the flow channels of the anode mass flow field and the flow channels of the cathode mass flow field are parallel to each other.

40. The electrochemical cell of claim 39, wherein the flow channels of the anode mass flow field and of the cathode mass flow field are both vertical.

41. The electrochemical cell of claim 39, wherein each of the anode and the cathode comprise an electrochemically active material.

42. The electrochemical cell of claim 41, wherein the electrochemically active material is bonded to a support structure.

43. The electrochemical cell of claim 42, wherein the support structure comprises carbon paper.

44. The electrochemical cell of claim 42, wherein the support structure comprises graphite cloth.

45. The electrochemical cell of claim 42, wherein the electrochemically active material comprises a catalyst material on a support material.

46. The electrochemical cell of claim 45, wherein the support material comprises particles of carbon and particles of polytetrafluoroethylene.

47. The electrochemical cell of claim 46, wherein the electrochemically active material is bonded by the particles of polytetrafluoroethylene to the support structure.

48. The electrochemical cell of claim 39, wherein the anode and the cathode are gas diffusion electrodes.

49. The electrochemical cell of claim 48, wherein the catalyst loading of the electrochemically active material is in the range of 0.10 to 0.50 mg/cm$^2$.

50. The electrochemical cell of claim 39, wherein the electrochemically active material comprises one of the following: platinum, ruthenium, osmium, rhenium, rhodium, iridium, palladium, gold, titanium and zirconium, and the oxides, alloys and mixtures thereof.

51. The electrochemical cell of claim 50, wherein the electrochemically active material is applied as a film from ink onto the membrane.

52. The electrochemical cell of claim 51, wherein the loading of the electrochemically active material is at least about 0.017 mg/cm$^2$.

53. The electrochemical cell of claim 50, wherein the cation-transporting membrane is a proton-transporting membrane.

54. The electrochemical cell of claim 53, wherein the proton-transporting membrane comprises a copolymer of tetrafluoroethylene and poly-sulfonyl fluoride vinyl ether-containing pendant sulfonic acid groups.

55. The electrochemical cell of claim 54, wherein the electrochemically active material of the anode and the cathode is platinum.

56. The electrochemical cell of claim 54, wherein the electrochemically active material of the anode is ruthenium oxide.

57. The electrochemical cell of claim 56, wherein the electrochemically active material of the cathode is platinum.

58. A system for recycling a released fluid from an electrochemical cell used for the direct production of essentially dry halogen gas from essentially anhydrous hydrogen halide, comprising:
   (a) an electrochemical cell, including:
      (i) means for oxidizing molecules of essentially anhydrous hydrogen halide to produce essentially dry halogen gas and protons,
      (ii) cation-transporting means for transporting the protons therethrough having one side disposed in contact with the oxidizing means,
      (iii) means for reducing the transported protons, wherein the reducing means is disposed in contact with the other side of the cation-transporting means,
      (iv) inlet means for supplying water to the cation-transporting means, and
      (v) outlet means for releasing a fluid from the reducing means; and
   (b) means for recycling the fluid to the cation-transporting means.

59. The system of claim 58, wherein the recycling means comprises a cooler for cooling the released fluid before the released fluid is recycled to the membrane.

60. The system of claim 59, wherein the released fluid comprises hydrogen halide and further wherein the recycling means comprises a separator for removing a portion of the hydrogen halide from the released fluid.

61. The system of claim 60, wherein the recycling means further comprises a scrubber for removing another portion of the hydrogen halide from the released fluid.

62. The system of claim 58, wherein the recycling means further comprises a compressor for compressing the released fluid before the released fluid is recycled to the membrane.

63. The system of claim 58, wherein the recycling means further comprises a pump for pumping the released fluid to the membrane.

64. The system of claim 58, wherein the recycling means further comprises tempering means for tempering the released fluid before the released fluid is recycled to the membrane.

65. The system of claim 58, wherein the recycling means further comprises a humidifier for humidifying the released fluid before the released fluid is recycled to the membrane.

66. The system of claim 58, wherein the recycling means further comprises a conditioner for conditioning the released fluid before the released fluid is recycled to the membrane.

67. The system of claim 58, wherein the released fluid comprises oxygen and the recycling means further comprises an oxygen supply for supplying additional oxygen to the released fluid before the released fluid is recycled to the membrane.

* * * * *